United States Patent
Benitez et al.

(10) Patent No.: US 8,538,144 B2
(45) Date of Patent: Sep. 17, 2013

(54) METHODS AND SYSTEMS FOR COLOR CORRECTION OF 3D IMAGES

(75) Inventors: Ana B. Benitez, Los Angeles, CA (US); Dong-Qing Zhang, Burbank, CA (US); James A. Fancher, Marina Del Rey, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1001 days.

(21) Appl. No.: 12/311,839

(22) PCT Filed: Nov. 21, 2006

(86) PCT No.: PCT/US2006/044953
§ 371 (c)(1),
(2), (4) Date: Apr. 15, 2009

(87) PCT Pub. No.: WO2008/063167
PCT Pub. Date: May 29, 2008

(65) Prior Publication Data
US 2010/0290697 A1 Nov. 18, 2010

(51) Int. Cl.
*G06K 9/00* (2006.01)
(52) U.S. Cl.
USPC ............ 382/167; 382/154; 382/274; 382/282
(58) Field of Classification Search
USPC ................. 382/108, 154, 162, 167, 190, 195, 382/274, 282, 285, 286; 345/419, 426, 581, 345/582, 589
See application file for complete search history.

(56) References Cited

U.S. PATENT DOCUMENTS

| | | | |
|---|---|---|---|
| 6,320,578 B1 | 11/2001 | Shiitani et al. | |
| 6,707,938 B2 | 3/2004 | De Queiroz et al. | |

(Continued)

FOREIGN PATENT DOCUMENTS

| | | |
|---|---|---|
| JP | 9081737 | 3/1997 |
| JP | 11345319 | 12/1999 |

(Continued)

OTHER PUBLICATIONS

Debevec et al.:"Modeling and Rendering Architecture from Photographs: A Hybrid Geometry-and Image-Based Approach", Computer Graphics Proceedings 1996, New Orleans, Aug. 4, 1996, Computer Graphics Proceedings, New York, NY: ACM, US, pp. 11-20, XP000682717.

(Continued)

*Primary Examiner* — Phuoc Tran
(74) *Attorney, Agent, or Firm* — Robert D. Shedd; Robert B. Levy

(57) ABSTRACT

A system and method for color correction of 3D images including at least two separate image streams captured for a same scene include determining three-dimensional properties of at least a portion of a selected image stream, the three-dimensional properties including light and surface reflectance properties, surface color, reflectance properties, scene geometry and the like. A look of the portion of the selected image stream is then modified by altering the value of at least one of the determined three-dimensional properties and, in one embodiment, applying image formation theory. The modifications are then rendered in an output 3D picture either automatically and/or according to user inputs. In various embodiments, corrections made to the selected one of the at least two image streams can be automatically applied to the other of the image streams.

25 Claims, 4 Drawing Sheets

(56) References Cited

U.S. PATENT DOCUMENTS

| | | | |
|---|---|---|---|
| 6,983,064 B2 | 1/2006 | Song | |
| 2003/0128273 A1 | 7/2003 | Matsui et al. | |
| 2004/0070565 A1* | 4/2004 | Nayar et al. | 345/156 |
| 2004/0258297 A1 | 12/2004 | Yeh et al. | |
| 2005/0069201 A1 | 3/2005 | Speigle et al. | |
| 2005/0158044 A1 | 7/2005 | Ide et al. | |
| 2007/0132759 A1* | 6/2007 | Mallick et al. | 345/426 |
| 2009/0010507 A1 | 1/2009 | Geng | |

FOREIGN PATENT DOCUMENTS

| | | |
|---|---|---|
| JP | 2000184396 | 6/2000 |
| JP | 2002345000 | 11/2002 |
| JP | 2005208300 | 8/2005 |
| JP | 2005229280 | 8/2005 |
| JP | 2005275790 | 10/2005 |
| WO | WO2005034527 | 4/2005 |
| WO | WO2007/142649 | 12/2007 |
| WO | WO2008063167 | 5/2008 |

OTHER PUBLICATIONS

Loscos et al.:"Interactive Virtual Relighting of Real Scenes", IEEE Transactions on Visualization and Computer Graphics, IEEE Service Center, Los Alamitos, CA, USA, vol. 6, No. 4, Oct. 2000, pp. 289-305, XP000976847.

Marschner et al.:"Inverse Lighting for Photography". Fifth Color Imaging Conference: Color Science, Systems and Applications. Nov. 1997. pp. 262-265, XP002449913.

Patow et al.:"A Survey of Inverse Rendering Problems", Computer Graphics Forum, vol. 22, No. 4. 2003, pp. 663-687, XP009089151.

Powell et al.:"A Methodology for Extracting Objective Color From Images", IEEE Transactions on Systems, Man and Cybernetics. Part B: Cybernetics, IEEE Service center, Piscataway, NJ, USA, vol. 34, No. 5, Oct. 2004, pp. 1964-1978, XP011118826.

Theobalt et al., "Joint Motion and Reflectance Capture for Creating Relightable 3D Videos," Research Report MPI-I-2005-4-004, Apr. 2005, pp. 1-17, XP002450145, Max Planck Institut Fur Informatik, Saarbrucken, Germany.

International Search Report, dated Sep. 25, 2007.

Office Action for U.S. Appl. No. 12/308,137 mailed May 12, 2011.
Office Action for U.S. Appl. No. 12/308,137 mailed Oct. 14, 2011.
Office Action for U.S. Appl. No. 12/308,137 mailed Mar. 26, 2012.
Office Action for U.S. Appl. No. 12/308,137 mailed May 2, 2012.
Office Action for U.S. Appl. No. 12/308,137 mailed Dec. 28, 2012.
Office Action for U.S. Appl. No. 12/308,137 mailed Jul. 15, 2013.

* cited by examiner

METHODS AND SYSTEMS FOR COLOR CORRECTION OF 3D IMAGES

This application claims the benefit, under 35 U.S.C. §365 of International Application PCT/US2006/044953 filed Nov. 21, 2006 which was published in accordance with PCT Article 21(2) on May 29, 2008 in English.

FIELD OF THE INVENTION

The present invention generally relates to color correction systems and methods and, more particularly, to systems and methods where image formation theory is employed to enhance and enable color correction of three-dimensional images in image content such as a motion picture or a video scene.

BACKGROUND OF THE INVENTION

Traditional color correction is a purely two dimensional (2D) technique that only deals with pixel values in a 2D image. All conventional color correction supports primary color operations such as lift, gain gamma, and American Society of Cinematographers Color Decision List (ASC CDL) functions specified by an operator that are applied globally to all the pixels in an image. More recently, however, color corrections also support secondary operations that are applied only to some select pixels in an image.

Traditional color correction, however, fails to exploit the relation between simultaneous channels of images and related information that results from capture with stereo cameras and the like. In addition, existing color correction processes do not take into account or modify the actual lighting conditions, light-reflectance properties or three-dimensional (3D) geometry information of objects in the scene. Therefore, traditional color correction processes are insufficient for color correcting 3D images.

SUMMARY OF THE INVENTION

The present invention addresses the deficiencies of the prior art by providing a method, apparatus and system for the color correction of three-dimensional (3D) images such as stereoscopic images. In various embodiments of the present invention, color correction of 3D images such as stereo images begins with a user color correcting images in a left channel using primary color operations. Subsequently, those color operations are copied to the images in the right channel. Finally, the user can review and manually refine the color correction for the images in the right channel to correctly match those in the left channel.

In one embodiment of the present invention, a method for color correction of 3D images including at least two separate image streams captured for a same scene includes determining at least one three-dimensional property of at least a portion of a selected image stream of the three-dimensional image, and modifying an appearance of at least the portion of the selected image stream by altering a value of at least one determined three-dimensional property. The three dimensional properties can include information about geometry, light, surface reflectance properties and the like. The appearance of the portion of the selected image stream can then be modified by altering at least one determined three-dimensional property and applying, for example, image formation theory. The modification can then be rendered accordingly in the 3D images (e.g., the two separate image streams). In various embodiments, corrections made to the selected one of the at least two image streams can be automatically applied to the other of the image streams.

In an alternate embodiment of the present invention, a system for color correcting a three-dimensional image includes a reference display device configured to display images for color correction and a color correction device. The color correction device of the embodiment of the present invention is configured to determine at least one three-dimensional property of at least a portion of a selected image stream of the three-dimensional image, and to modify an appearance of at least the portion of the selected image stream by altering a value of at least one determined three-dimensional property. A system of the present invention can further include at least two image capture devices or, alternatively, a stereo camera for capturing the at least two image streams.

BRIEF DESCRIPTION OF THE DRAWINGS

The teachings of the present invention can be readily understood by considering the following detailed description in conjunction with the accompanying drawings, in which.

Figure 1:
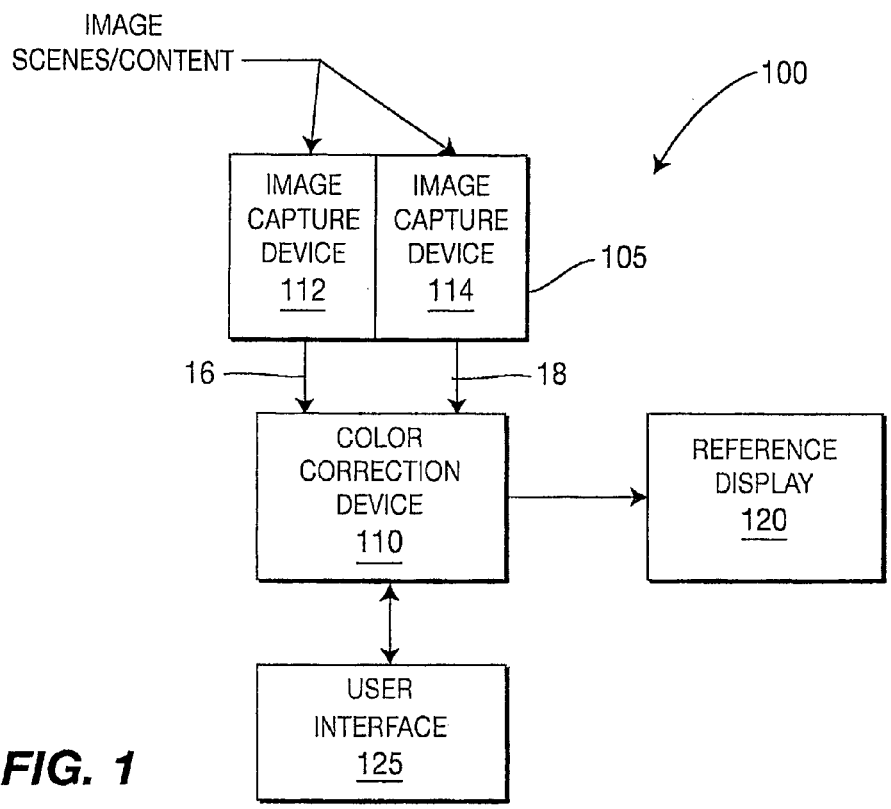
FIG. 1 depicts a high level block diagram of a color correction system 100 for the color correction of three-dimensional (3D) images such as stereoscopic images in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for the color correction of three-dimensional (3D) images such as stereoscopic images. Although the present invention will be described primarily within the context of a post-processing environment, such as a video recording and/or editing system, the specific embodiments of the present invention should not be treated as limiting the scope of the invention. It will be appreciated by those skilled in the art and informed by the teachings of the present invention that the concepts of the present invention can be advantageously applied in any environment for the color correction and/or color adjustment of captured images or portions of images such as any digital multimedia system, which is capable of capturing and/or editing images, such as a camera, video recorder, cellular phone, movie camera, or over a network. In addition, the concepts of the present invention are applicable to any recording method capable of stereo or dual image capture using, for example, 3D scene capture devices.

In various embodiments of the present invention, two simultaneous channels of images (e.g., left and right images with any additional metadata in a stereo image pair) are received. Each channel is processed according to extracted three-dimensional geometry and lighting models. The models take into account the difference between the two image streams and modify each stream according to instructions from, for example, user inputs. Embodiments of the present invention provide standard primary color correction such as American Society of Cinematographers Color Decision List (ASC CDL) operations for each channel as well as secondary correction such as operations on specific regions of the received images.

In embodiments of the present invention, object definition and tracking, using information extracted from the two streams and/or from a 3D database, is implemented to assist a user in isolating picture elements for specific types of alterations to an object's attributes such as light reflectance and the like. Modeling the 3D images in accordance with the present invention enables changes in an image of a first channel to be easily and automatically translated and implemented in an image of a second channel.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

FIG. 1 depicts a high level block diagram of a color correction system 100 for the color correction of three-dimensional (3D) images such as stereoscopic images in accordance with an embodiment of the present invention. The color correction system 100 of FIG. 1 illustratively comprises an image capture device 105, a color correction device 110 and a reference display 120. In the color correction system 100 of FIG. 1, image content is captured by the image capture device 105. The image capture device 105 generates two image streams of the same captured image (or image scene) in the form of two separate channels 16 and 18. For example, in one embodiment of the present invention, the image capture device 105 can comprise a stereo camera capable of producing two image streams of the same captured image (e.g., left and right image streams/channels for creating 3D images). In an alternate embodiment of the present invention, the image capture device 105 can comprise two separate image capture devices 112 and 114 for providing two simultaneous channels 16 and 18 of the captured image.

The two image streams 16 and 18 are communicated to the color correction device 110. In the color correction device 110, each channel 16 and 18 is processed accordingly to provide a three dimensional lighting and geometry model, which is created and stored in the color correction device 110. The model takes into account differences between the two image streams 16 and 18. Each stream can then be modified according to instructions from, for example, an operator. In one embodiment of the present invention, the color correction device 110 provides standard primary color correction such as the ASC CDL operations for each channel 16 and 18 as well as secondary corrections such as operations on specific regions of the image streams. Although the embodiment of FIG. 1 is described within the context of producing and providing two separate streams for 3D imaging, in alternate embodiments of the present invention, 2D images with corresponding depth maps can also be employed for 3D imaging.

Figure 2:
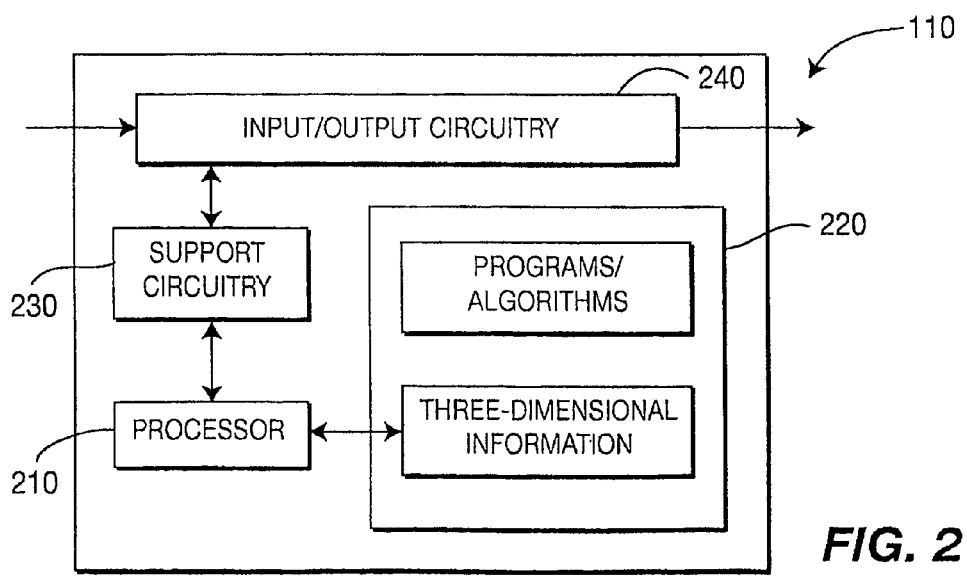
FIG. 2 depicts a high level block diagram of an embodiment of a color correction device suitable for use in the color correction system of FIG. 1 in accordance with the present invention.

FIG. 2 depicts a high level block diagram of an embodiment of a color correction device suitable for use in the color correction system 100 of FIG. 1 in accordance with the present invention. The color correction device 110 of FIG. 2 comprises a processor 210 as well as a memory 220 for storing control programs, geometric and lighting information and models, an object database and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The color correction device 110 also contains input-output circuitry 240 that forms an interface between the various respective functional elements communicating with the color correction device 110.

Although the color correction device 110 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In one embodiment of the present invention, the color correction system 100 of the present invention can further comprise a user interface 125 for enabling a user to input into the color correction device 110 information regarding environmental information and color correction parameters. The user interface 125 of the color correction device 110 of FIG. 1 can comprise wireless remote controls, pointing devices, such as a mouse or a trackball, voice recognition systems, touch screens, on screen menus, buttons, knobs and the like. In addition, the user interface 125 can be provided directly on the color correction device 110 or on a remote panel or device.

Figure 3:
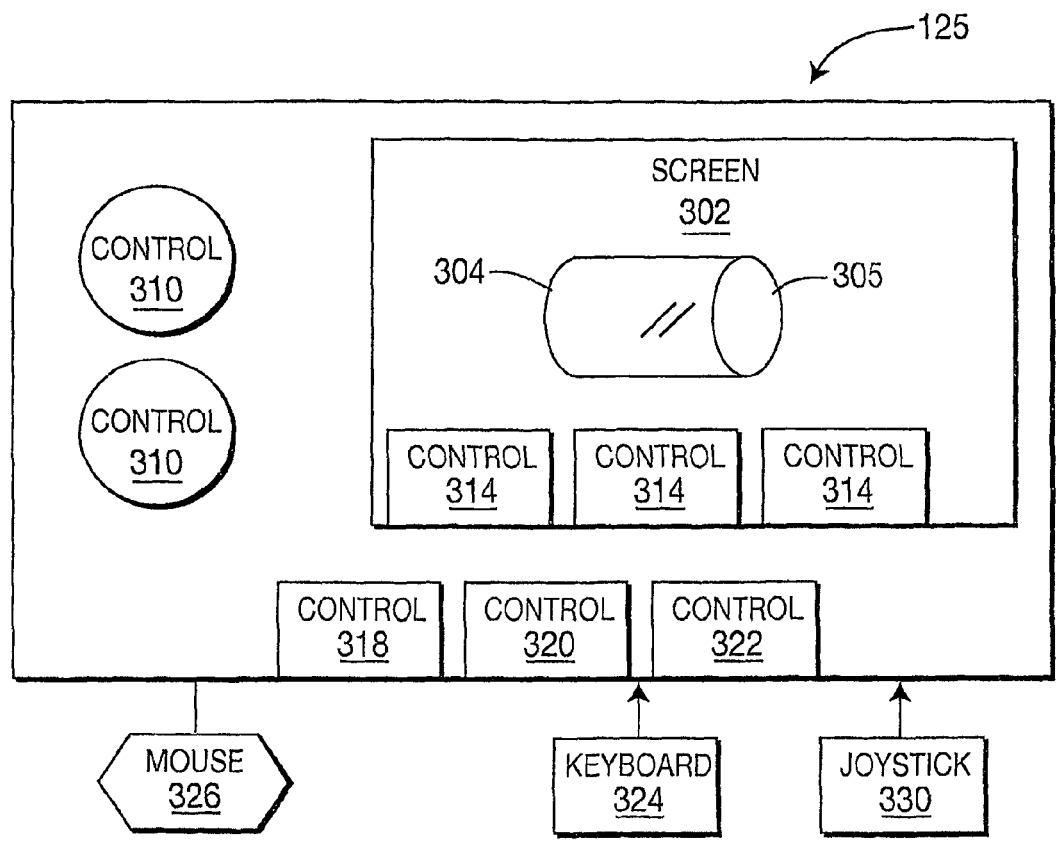
FIG. 3 depicts a high level block diagram of a user interface suitable for use in the color correction system of FIG. 1 in accordance with an embodiment of the present invention.

For example, FIG. 3 depicts a high level block diagram of a user interface suitable for use in the color correction system of FIG. 1 in accordance with an embodiment of the present invention. The user interface 125 of FIG. 3 can comprise a stand alone workstation including a screen or display 302 or can be implemented in software as a graphical user interface on a computer with a processor or controller. Controls 310-326 can include actual knobs/sticks 310, keypads/keyboards 324, buttons 318-322, virtual knobs/sticks and/or buttons 314, and a mouse 326 depending on the implementation of the user interface 125.

The screen 302 includes a region for viewing images or image components to permit color correction and geometric or light source modification in the images. A user controlled cursor (not shown) can be employed on screen to activate controls and to highlight or make active portions of the screen 302. A cursor can be implemented and moved using the mouse 326, the keypad 324, joystick or other selection/pointing device 330, which can be maintained as part of or separate from the user interface 125.

In one example, a region 304 of an image(s) is selected for processing. The region can include an object 305 for which geometric data, light source data, reflectance data and any other characteristic may have been collected and stored. The object 305 is preferably selected to include a constant property (e.g., reflectance (non-emitting surface), etc.) and can be used as a way of determining or inferring a light source position, geometric characteristics or both. A rendering of the images can be displayed on screen 302 (alternatively, a rendering of the images can be displayed on the reference display 120). Modifications can be made to the images based on the set of properties gathered during the capture of the images or attributed to the objects of the images by inference (described in further detail below). This includes 3D information gathered through the use of the capture device(s). The editing tools and refinements described herein can be performed automatically using software based tools, manual manipulation or a combination of both. This can include the transferring of updated image information between one of the images of the channel pair to the other automatically based on the geometry models.

Referring back to FIG. 1, in the color correction device 110 the 3D pictures (e.g., left and right image streams) are analyzed to construct the lighting, surface reflectance, and 3D geometric models of a captured scene. This process can be an interactive process that includes an input(s) from a user via the user interface 125. The 3D geometric models can be created using 3D information collected for example during the capture of the images. For example, in one embodiment of the present invention the color correction device of the present system can be located in the region of image capture and can comprise various sensors (not shown) for determining environmental conditions involved in image capture. For example, a color correction device of the present invention can comprise light sensors for determining the lighting conditions of an environment in which an image was captured.

Based on the lighting, reflectance and 3D geometric models determined by the color correction device 110, the lighting, surface reflectance properties, and surface geometry of objects in the scene can be modified. The operations specified will be applied to both image streams. In various embodiments of the present invention, the inventors implement an image formation theory for determining aspects of a captured image. For example, the formation of an image depends on at least the following four factors: camera, scene geometry, light source and surface reflectance properties. The relationship between the reflected radiance (which is proportional to the final observed pixel value in one of the captured 2D images after camera projection) and the above four factors after decomposing the diffuse and specular components and using the Phong model for specular reflectance can be approximated according to equation one (1), which follows:

$$L_r(x,\omega_r,\lambda)=L_e(x,\omega_r,\lambda)+\rho_d(x,\lambda)\int_{\Omega_i}L_i(x,\omega_i,\lambda)\cos\theta_i d\omega_i+\rho_s(x,\lambda)L_s(x,\omega_s,\lambda)(\cos\theta_s)^n \quad (1)$$

where $L_r(x,\omega_r,\lambda)$ depicts the reflected radiance, which is proportional to an observed pixel value after camera projection; x is the point on the scene surface $\omega_r$ depicts the reflection angle; $\lambda$ depicts the wavelength of the light ray; $L_e(x,\omega_r,\lambda)$ depicts the radiance emitted by the surface; $L_i(x,\omega_i,\lambda)$ depicts the incident radiance; $\omega_i$ depicts the incident angle; $\omega_s$ depicts the angle of the specular direction, which is determined by the surface normal and incident ray; $L_s$ depicts the radiance along the specular direction; $\rho_d$ and $\rho_s$ depict the diffusive and specular albedo (reflection rate), respectively; $\cos\theta_s=(\omega_s\cdot\omega_r)$ and n depicts a parameter that determines the sharpness of the specularity; and $\cos\theta_i=(\omega_i\cdot N)$, where N is the surface normal. The relationship between these elements is illustratively depicted in FIG. 4.

Figure 4:
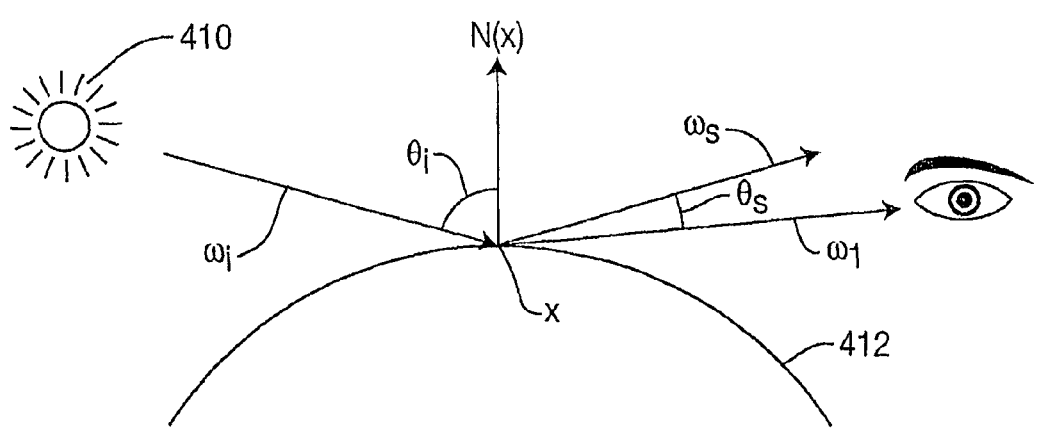
FIG. 4 depicts a diagram illustrating the principles of surface rendering in accordance with an embodiment of the present invention.

More specifically, FIG. 4 depicts a diagram of the basic principles for surface rendering. In FIG. 4, a source of light 410 provides light at incident angle $\omega_i$, which forms an angle $\theta_i$ with a normal N(x). Normal N(x) is normal to a surface 412 which is responsible for reflecting the light from source 410. In the diagram of FIG. 4, $\omega_r$ depicts the angle of reflectance from, for example a first capture position, $\omega_s$ depicts the angle of the specular direction and $\theta_s$ depicts the angle between them. Furthermore, in the diagram of FIG. 4 $\omega_{r'}$ depicts the angle of reflectance from, for example a second capture position, and $\theta_{s'}$ depicts the angle between the angle of reflectance from the second capture position and $\omega_s$, the angle of the specular direction.

In the present invention, 3D scene information captured for the left and right channels 16 and 18 is considered. As such, equation (1) for each of the channels can be characterized according to equations two (2) and three (3), which follow:

$$L_r(x,\omega_r,\lambda)=L_e(x,\omega_r,\lambda)+\rho_d(x,\lambda)\int_{\Omega_i}L_i(x,\omega_i,\lambda)\cos\theta_i d\omega_i+\rho_s(x,\lambda)L_s(x,\omega_s,\lambda)(\cos\theta_s)^n \quad (2)$$

$$L_r(x,\omega_{r'},\lambda)=L_e(x,\omega_{r'},\lambda)+\rho_d(x,\lambda)\int_{\Omega_i}L_i(x,\omega_i,\lambda)\cos\theta_i d\omega_i+\rho_s(x,\lambda)L_s(x,\omega_{s'},\lambda)(\cos\theta_{s'})^n \quad (3)$$

For purposes of distinction, in one embodiment of the present invention equation (2) can depict a right eye channel and equation (3) can depict a left eye channel. Note that the second term $(\rho_d(x,\lambda)\int_{\omega_i}L_i(x\omega_i,\lambda)\cos\theta_i d\omega_i)$ in both equations (2) and (3) is the same.

Equations (2) and (3) can be further simplified for non-emitting surfaces (e.g., the first terms $(L_e(x,\omega_r,\lambda))$ of equations (2) and (3)=0) and/or Lambertian surfaces (third term $(\rho_s(x,\lambda)L_s(x,\omega_s,\lambda)(\cos\theta_s)^n)$ of equations (2) and (3)=0).

The extraction of lighting, surface reflectance, and 3D geometry models from the 3D images can also be obtained from 2D images in two stereo channels.

In embodiments of the present invention, an interactive process takes into account human input as well as the 3D scene information (e.g., left and right image streams) and the lighting information (e.g., pictures of mirror spheres for the scene) to extract and refine these models, as will be described with reference to FIG. 5. For example and as described above, to realize color correction capabilities in 3D environments, information of light sources and surface geometry as well as surface reflectance properties can be needed before processing. There are several ways to obtain the 3D information from images including for example, from external sources or inferred from an image being processed. For the external sources, 3D geometry can be acquired by geometry capturing devices such as, for example, laser scanners or other devices and/or user inputs. Light information can be determined from light sensors and/or lighting capture devices such as mirror balls. For inferring environmental properties from an image, attempting to recover scene geometry, light and surface reflectance properties simultaneously from a single image is difficult, as multiple unknown variables exist. However, in the color correction process, users can interact with the system to achieve the desired effects.

The user-computer interaction and the 3D images therefore can be exploited for facilitating and enhancing scene geometry reconstruction. For example, a user can select a "good" region for the system to infer the light sources. Then, the inferred light sources can be used for more complicated regions. Users can also estimate the positions of the light sources and assist the system to interactively refine the light sources and the 3D geometry of the scene. Likewise, geometric information can be obtained from an object in a scene based upon two cameras having a slightly different position and concurrently capturing the image data or other 3D picture capture devices. In this manner, the two images can be compared using, for example, computer vision software tools to determine geometric characteristics in three dimensions and create a model. Note 3D images include geometric information for three dimensions.

Figure 5:
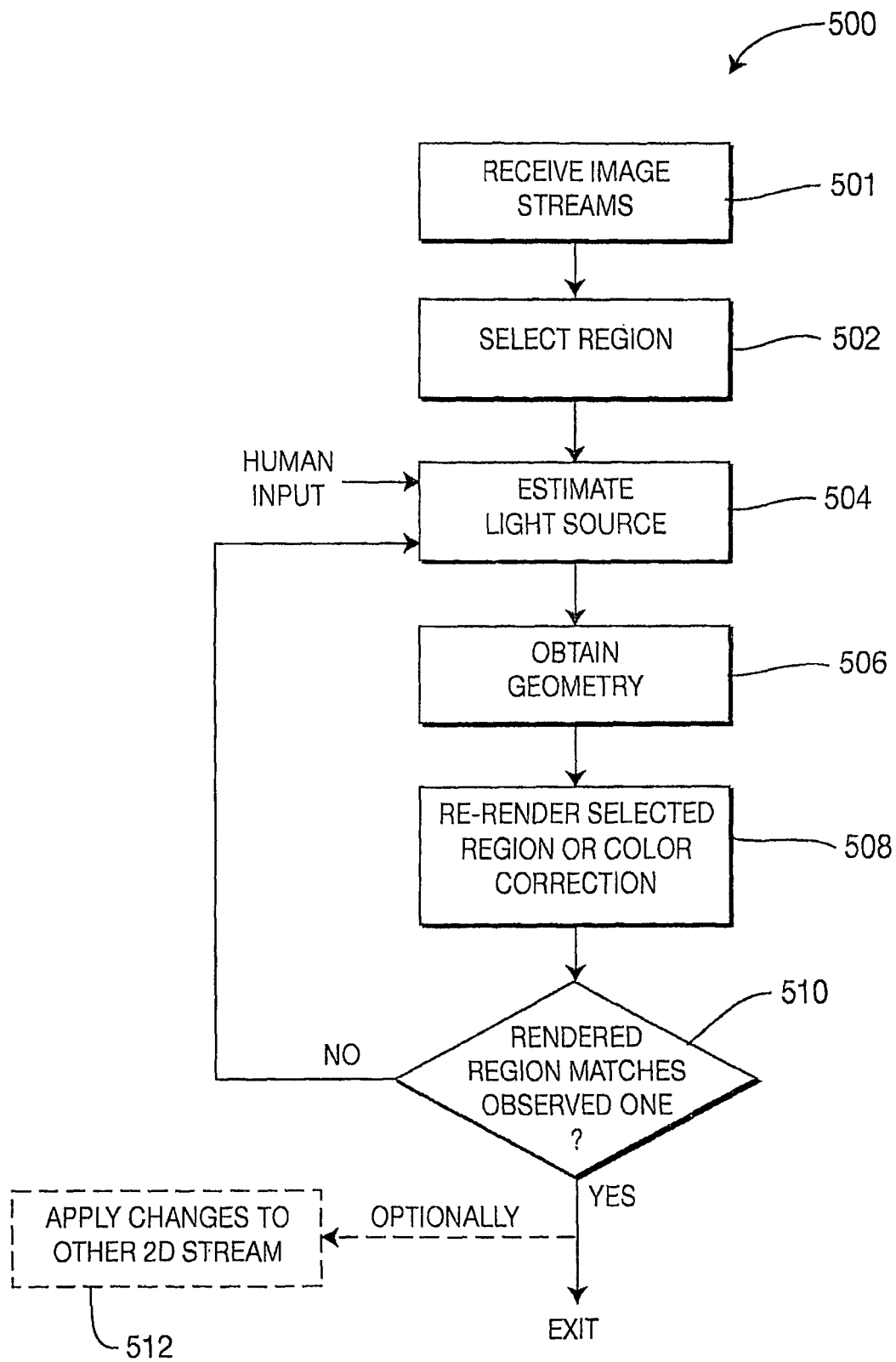
FIG. 5 depicts a flow diagram of a method for determining three-dimensional information in accordance with an embodiment of the present invention.

For example, FIG. 5 depicts a flow diagram of a method 500 for determining three-dimensional information of a scene in accordance with an embodiment of the present invention. The method 500 of FIG. 5 begins at step 501 in which image information (e.g., scene information) is received over at least two channels (e.g., image streams). Each channel can carry an information stream of the same scene taken from a slightly different angle, for example, using a stereo camera or two separate cameras. The method 500 proceeds to step 502.

At step 502, a user selects a region of a received image with certain properties (for example, Lambertian surfaces). More specifically, at step 502, a particular region of the received images can be selected to assist in the building of surface or 3D models. For example, if (even approximated values) for the specular albedo, the radiance along the specular direction, and the camera positions are known, then, the surface normal can be determined using equations four (4) and five (5), which follow:

$$(\cos\theta_s)^n - (\cos\theta_{s'})^n = \frac{L_r(x, \omega_r, \lambda) - L_r(x, \omega_{r'}, \lambda)}{\rho_s(x, \lambda)L_s(x, \omega_s, \lambda)} \quad (4)$$

$$\frac{(\cos\theta_s)^n}{(\cos\theta_{s'}')^n} = \frac{L_r(x, \omega_r, \lambda) - \rho_d(x, \lambda)\int_{\Omega_i} L_i(x, \omega_i, \lambda)\cos\theta_i d\omega_i}{L_r(x, \omega_{r'}, \lambda) - \rho_d(x, \lambda)\int_{\Omega_i} L_i(x, \omega_i, \lambda)\cos\theta_i d\omega_i} \quad (5)$$

In addition, if there are a finite number of known lighting sources and a surface is Lambertian, then, this surface can be selected to assist in creating the 3D model. A user selects a region of an image or portion thereof with certain known properties, such as specular albedo, radiance along the specular direction, and camera positions and/or Lambertian surfaces. The method 500 then proceeds to step 504.

At step 504, a user provides a determination or an estimation of a three-dimensional property, in this case the light positions in a scene, in accordance with the image content. In an alternate embodiment of the invention, however, the three-dimensional property can be inferred from previously received images. The method 500 then proceeds to step 506.

At step 506, 3D geometry models can be built from two simultaneous channels of scene geometry information (e.g., left and right image streams) using computer vision techniques. Left and right image pairs are first registered to share a common coordinate system. For example in one embodiment of the present invention, depth is calculated for every pixel based on image differences and camera positions, and 3D surface models are then fitted to the depth measurements. In addition, since streams of left and right images are available (not only a left and right image pair), 3D geometry information can be estimated from previous left and right image pairs in time as well. This can greatly assist in improving the accuracy of the constructed 3D geometry models if objects or the camera move. Furthermore, additional 3D geometry information can be extracted using the equations (2)-(5) above by, for example, assuming non-emitting surfaces. The method 500 then proceeds to step 508.

At step 508, the selected region is re-rendered. Such re-rendering can be realized using existing ray-tracing algorithms. The method 500 then proceeds to step 510.

At step 510, the appearance of the original selected region and the re-rendered region are compared. If the re-rendered region and the original region do not match well, the method returns to step 504 in an attempt to achieve a better match by, for example, re-estimating the light positions. If the re-rendered region and the original region do match well, the method is exited. A match can be based on objective criteria or image specifications that can be used to determine if the image has improved. In accordance with the present invention, once the three-dimensional information (e.g., three-dimensional properties) of a scene is determined as described above, the three-dimensional properties (e.g., light source position and intensity, surface reflectance, etc.) can be modified (described in further detail below) to achieve a desired "look" for an image. In embodiments of the present invention, the match can include information from light sources and geometry from the two image channels. The final light information can then be re-used for other regions in the same image.

Optionally, at step 512, any changes implemented by the process of the present invention to a selected one of the 2D streams can be automatically or via user input applied to the other stream using the underlying three-dimensional model.

An embodiment of a method of the present invention for the recovery of the scene geometry given the light sources for one 2D image will now be described in further detail. Assuming the selected region is a Lambertian surface patch having constant albedo or other constant properties, the albedo map can be piece-wise constant and, therefore, it should not be difficult to find a region with constant albedo on the albedo map. Note that for Lambertian surfaces, the light, geometry and albedo are constrained by equation six (6), which follows:

$$L_r(x, \omega_r, \lambda) = \rho_d(x, \lambda)\int_{\Omega_i} L_i(x, \omega_i, \lambda)\cos\theta_i d\omega_i \quad (6)$$

$$= \rho_d(x, \lambda)I_d(x, \lambda)$$

If the albedo is constant in the selected color correction region, knowing one of either the light or the geometry can assist in recovering the other factor. In many cases, a scene surface can be approximated as a Lambertian surface, where the reflectance property is constant along every direction, which also indicates that the specular term in equation (1) vanishes. If the surface emission can be also ignored (which is true for most surface types), the following simplified form may be provided:
where $$I_d(x, \lambda) = \int_{\Omega_i} L_i(x, \omega_i, \lambda)\cos\theta_i d\omega_i$$

is traditionally called illumination image, which encodes the interaction of light and surface geometry while excluding the influence of the scene albedo. It is clear that the albedo map can be recovered from an observed image and the illumination image according to equation seven (7), which follows:

$$\rho_d(x, \lambda) = \frac{L_i(x, \omega_i, \lambda)}{I_d(x, \lambda)}. \quad (7)$$

Given the albedo map (constant in the region) and the light position (finite number of point light sources), the geometry can be recovered by first obtaining the surface normal N(x) according to equation eight (8), which follows:

$$L_r(x, \omega_r, \lambda) = \rho_d(x) \sum_i (N(x) \cdot \omega_i(x)) L_i \qquad (8)$$

where $L_i$, depicts the radiance of the point light source i; N(x) depicts the surface normal; and $\omega_I$ depicts the incidence light ray of the light source i. However, solving equation (8) can be difficult because equation (8) can have an infinite number of solutions. To make solving the problem more well-defined, the inventors propose imposing a constraint that the normal map is continuous and smooth within the region. Therefore, a well-defined function can be characterized according to equation nine (9), which follows:

$$F(N(x)) = \qquad (9)$$
$$\int \left| L_r(x, \omega_r) - \rho_d(x) \sum_i (N(x) \cdot \omega_i(x)) L_i \right|^2 dx + \lambda \int |\nabla_x N(x)|^2 dx$$

The first term (the first integral) of the function in equation (9) attempts to satisfy equation (8), while the second term (the second integral) is a regularization term for imposing the smooth constraint. By minimizing the function of equation (9), the approximated normal map N(x) can be characterized according to equation ten (10), which follows:

$$\hat{N}(x) = \underset{N(\cdot)}{\mathrm{argmax}} F(N(x)). \qquad (10)$$

Functions similar to the function of equation (6) have been used to determine conditions in other industries, such as optical flow estimation. The solution in general can be found by gradient decent, or converting the function minimization to solve an Euler-Lagrange differential equation, which is then solved by known numerical methods. Once the normal map is recovered, the geometry in the region can be recovered by solving a second order differential equation with the region boundary as the initial condition. The approach to computing a 3D surface from the normal map can be found in standard computer vision textbooks.

Color correction with image formation theory and 3D information using image formation in accordance with the present invention will now be described. The present invention enables users (e.g., colorists) to change the "look" of an image by modifying at least the light color, the surface color and reflectance property, the light position, and the surface geometry. In addition, other changes can be employed. For example, any combination of these factors can be modified to create a desired "look". Such changes are preferably implemented in steps 504 and 508 of the method of FIG. 5 as described above. The changes can be rendered into the 3D pictures accordingly based on instructions provided by an operator. For example, in the case of stereo pairs, the corrections will be automatically rendered for the images in the left and right channels based on 3D geometry information and geometry correspondence between the two channels.

In one embodiment of the present invention, suppose it is desired to only modify the color of the incident light. Then, the color of the light needs to be scaled. Specifically, multiplying the incident light radiance by a factor $S(\lambda)$ changes the composition of the color component of the incident light. This can be used to change the color temperature, brightness, etc. Then, the reflected light of the scene can be characterized according to equation eleven (11), which follows:

$$L_r(x, \omega_r, \lambda) = \int_{\Omega_i} (S(\lambda) L_i(x, \omega_i, \lambda)) f(x, \omega_i, \omega_r, \lambda) \cos\theta_i d\omega_i \qquad (11)$$
$$= S(\lambda) \int_{\Omega_i} L_i(x, \omega_i, \lambda) f(x, \omega_i, \omega_r, \lambda) \cos\theta_i d\omega_i$$

Equation (11) illustrates that scaling the light color is equivalent to scaling the final observed color. Therefore, modifying light color may be considered equivalent to the traditional color correction process.

Considering the simplest case of modifying a surface reflectance where the scene surface is assumed to be Lambertian and the material emission is ignored, the surface reflectance can be characterized according to equation twelve (12), which follows:

$$L_r(x, \omega_r, \lambda) = \rho_d(x, \lambda) \int_{\Omega_i} L_i(x, \omega_i, \lambda) \cos\theta_i d\omega_i \qquad (12)$$

As with the modifications described above, scaling the diffusive Albedo $\rho_d(x,\lambda)$ with $S(\lambda)$ is equivalent to scaling the final observed value.

For more general cases, where both emission and specular property are not negligible, the 3D geometry and light information are needed for rendering. By using the process described for 3D geometry and light source information from an external source (i.e., from a lighting capture device and/or a 3D scanner), a user can change the emission component $L_e(x,\omega_r,\lambda)$, change the diffusive albedo $\rho_d(x,\lambda)$, the specular albedo $\rho_s(x,\lambda)$ and the specular power n. The selected region can then be re-rendered using equations (2) and (3) described above. Such re-rendering can be realized using existing ray-tracing algorithms.

In an embodiment for modifying a light position and direction only, a user can change the position and the direction of the light if the light is directional. The user can also add additional light sources to the scene. If the 3D geometry of the surface is available, re-rendering can be simply achieved using equations (2) and (3) described above. By modifying the light positions, some special effects can be achieved, for example, changing the specularity of the surface.

In an embodiment for modifying the scene geometry only, a user can change the geometry of the selected region. Changing the geometry of a surface can be realized by B-Spline-like editing tools, which are implemented in some existing software packages. Once the geometry is modified, equations (2) and (3) can be used to re-render the selected surface using ray-tracing algorithms.

In addition to the single-factor correction methods described above, the above described methods can be combined to change different aspects of objects looks of an image in accordance with the present invention. For example, in a case for modifying both the geometry (e.g., surface reflectance) and the light of an image, as described in the image formation theory, the scene rendering can be described according to equation thirteen (13), which follows:

$$L_r(x, \omega_r, \lambda) = L_e(x, \omega_r, \lambda) + \quad (13)$$

$$\rho_d(x, \lambda) \int_{\Omega_i} L_i(x, \omega_i, \lambda) \cos\theta_i d\omega_i +$$

$$\rho_s(x, \lambda) L_s(x, \omega_s, \lambda)(\cos\theta_s)^n$$

$$= L_e(x, \omega_r, \lambda) + \rho_d(x, \lambda) I_d(x, \lambda) + \rho_d(x, \lambda) I_s(x, \lambda)$$

where $I_d(x,\lambda)$ depicts the illumination image, and similar to $I_d(x,\lambda)$, the specular illumination image can be characterized according to equation fourteen (14), which follows:

$$I_s(x,\lambda) = \rho_s(x,\lambda) L_s(x,\omega_s,\lambda)(\cos\theta_s)^n. \quad (14)$$

Both the illumination image and specular illumination image encode the light and geometry information of the 3D environment. By using illumination images, the light and geometry acquisition process can be avoided by only editing illumination images themselves instead of estimating geometry and light information. The illumination image and specular illumination images can be obtained by matte painting or can be rendered through a separate rendering process using the available 3D geometry. Once this is complete, equation (13) can be used to incorporate illumination images into the selected region.

The color correction method in accordance with embodiments of the present principles can modify lighting, surface reflectance, and 3D geometry to provide desired effects in a scene by modifying the lighting, surface reflectance, and 3D geometry models created from 3D geometry information of the scene. In accordance with various embodiments of the present invention, the color correction operations are rendered for the two synchronous channels of 2D images even when a user works on only one of the channels. This can be done automatically knowing the 3D geometry of the scene and the camera positions (step 520).

Embodiments of the methods of the present invention can be applied to the entire scene (or 3D picture) or to part of it. For example, a specific object could be segmented and tracked from the 3D pictures (this process is facilitated using the 3D geometry model) and its surface reflectance and geometry properties modified independently from the rest of the images.

Figure 6:
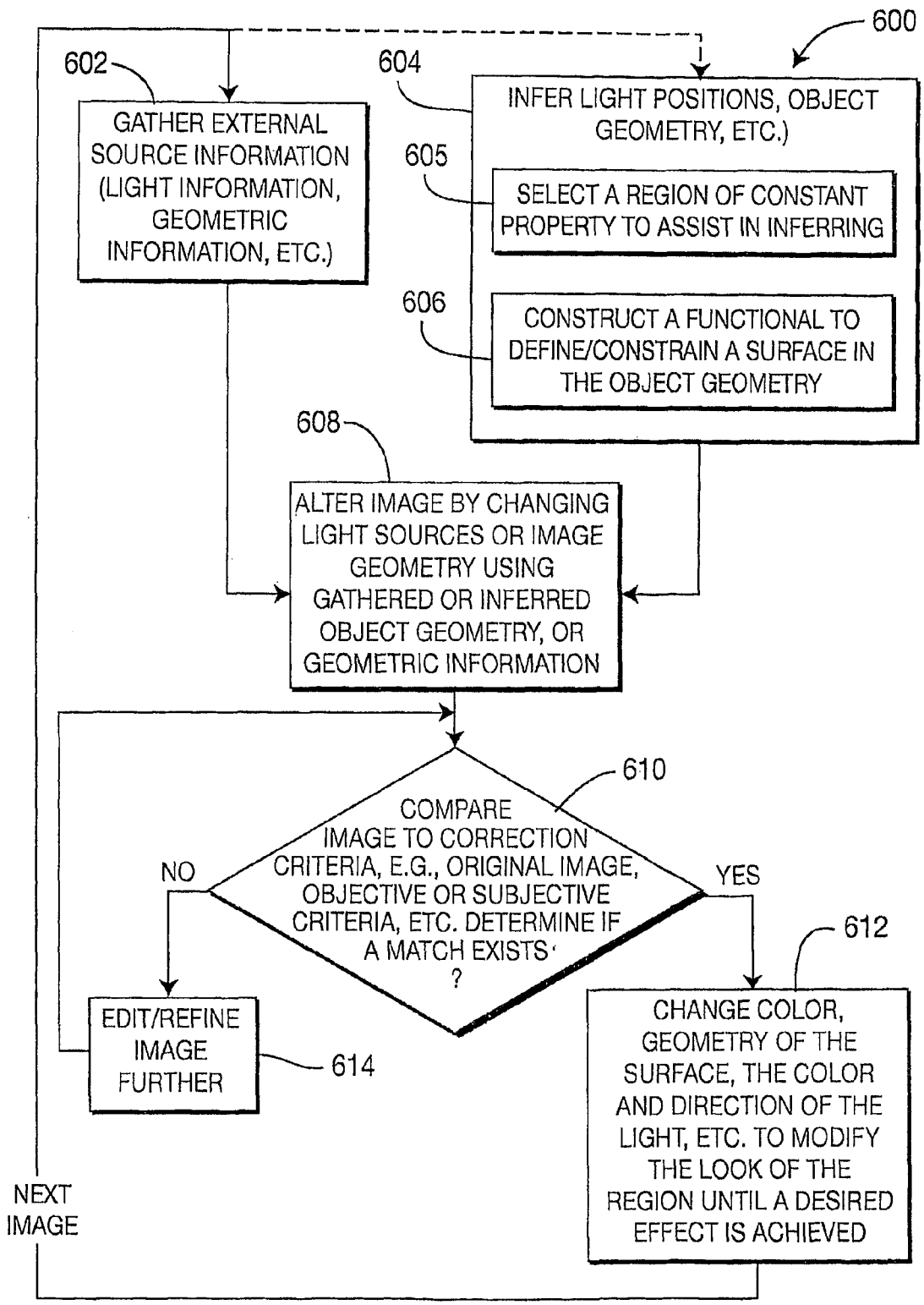
FIG. 6 depicts a flow diagram of a method for color correcting a 3D image using three-dimensional information in accordance with an embodiment of the present invention.

FIG. 6 depicts a flow diagram of a method for color correcting an image using three-dimensional information of a scene in accordance with an embodiment of the present invention. The method of FIG. 6 begins in step 602 in which information about characteristics of an object in a scene to be rendered in a received image are provided for color correction by gathering external source information regarding three-dimensional properties including at least one of reflectance, light source information and geometry information for the object in the scene. As described above, such information can be gathered using external sensors or user input. In accordance with embodiments of the present invention, the at least one of reflectance, light source information and geometry information is obtained using right and left channels of information gathered from a stereo camera or dual image capture devices or other 3D image capture devices. The method then proceeds to step 608.

Alternatively, the method 600 of FIG. 6 can begin in step 604, in which light source position and/or object geometry can be inferred from the received image. For example, as depicted in FIG. 6, inference of light source position and/or object geometry can include step 605 in which a region having a constant property or properties (e.g., Albedo, reflectance, etc.) is selected such that a light source position and/or the object geometry in the region is more easily determinable, and step 606, in which a function (e.g., equation (9)) is determined to define/constrain a surface for the object geometry. The method then proceeds to step 608.

At step 608, using at least one of the object geometry and the geometry information, the pixel values in a selected region are computed for geometry and light estimation by, in one embodiment, examining differences between the image streams of the two channels. In an alternate embodiment of the present invention, the pixel values in a selected region are computed for geometry and light estimation by changing the light source and/or changing the geometry of the selected region. The method then proceeds to step 610.

At step 610, the estimated pixel values for the region are compared to those in the original image to determine if a match exists. If a match exists, the method proceeds to step 612. If the match does not exist, the method skips to step 614.

At step 612, the color, geometry of the surface, the color and direction of light etc. are modified until a desired "look" is achieved. The method then proceeds to the next image and if no next image exists, then the method is exited and a resulting 3D image can be displayed on, for example, the reference display 120 of FIG. 1.

At step 614, further editing or refinement is performed by refining the portion of the image by refining the values of the light source and/or refining the values of the geometry of the portion of the image to achieve a closer match. The light sources and geometry can be refined using an illumination image and a specular image encoded with light and geometry information for a three dimensional environment. The method then returns to step 610.

In an optional step (not shown), after step 612 and the modification of a selected first stream of the at least two image streams, the changes applied to the selected first image stream can be applied to the second image stream (if applicable).

The method of the present invention can be repeated for other images or different regions of the same image. Referring back to step 612, the color, geometry of the surface and the color, direction of the light are altered until a desired "look" has been achieved. Desired "looks" can include correcting a particular color, fixing a geometric fault, or otherwise achieving a desired visual effect in accordance with objective or subjective standards. The corrections are mapped to the output 3D image (i.e., stereo pair) based on the 3D scene geometry and geometry correspondence between the two channels. This includes transferring changes from one image of the pair to the other automatically or by application by a user.

Having described preferred embodiments for methods and systems for color correction of 3D images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for color correction, comprising:
    capturing at least two separate video streams corresponding to a pair of stereoscopic images of a scene;
    determining at least one property of at least a portion of a selected video stream;

modifying an appearance of at least said portion of said selected video stream by altering a value of at least one determined property responsive to user input and the at least one determined property, and applying the altered value to the selected video stream to effect color corrections of the selected video stream; and applying color corrections to another of the at least two video streams in accordance with the selected video stream after color corrections.

2. The method of claim 1, wherein said at least one property comprises at least one of light properties, surface color, reflectance properties, and geometry of said at least one portion of said selected video stream.

3. The method of claim 1, further comprising selecting a region in said selected video stream in which to determine said at least one property.

4. The method of claim 3, wherein selecting a region in said video stream includes selecting a region of constant Albedo where radiance along a specular direction is known and positions of image capture devices is known.

5. The method of claim 1, wherein said determining comprises:
calculating depth values based on differences between said two captured video streams;
rendering at least a portion of said selected video stream using said calculated values; and
comparing said rendered portion of said selected video stream to a corresponding portion of said selected video stream prior to rendering to determine if a match exists there between.

6. The method of claim 1, wherein said at least one property is determined from a user input.

7. The method of claim 1, wherein said determining comprises inferring at least one of a light source position and object geometry based on a surface in said at least one portion of said selected video stream.

8. The method of claim 7, wherein said inferring comprises employing an image formation theory.

9. The method of claim 1, wherein said at least one property is determined using at least one sensing device.

10. The method of claim 9, wherein said at least one sensing device is located in a capture environment of said pair of stereoscopic images during image capture.

11. The method of claim 1, wherein a look of at least said portion of said selected video stream is modified using image formation theory, which includes determining a function to define a surface region of said at least one portion of said selected video stream.

12. The method as recited in claim 1, wherein the at least two video streams are captured using at least two image capture devices.

13. The method of claim 1, wherein the at least two video streams are captured using a stereo camera.

14. The method of claim 1, comprising implementing computer vision techniques to generate three-dimensional models from the at least two video streams.

15. A system for color correction, comprising:
a reference display device configured to display images for color correction; and
a color correction device in communication with said reference display configured to:
determine at least one property of at least a portion of a selected video stream of a received pair of stereoscopic images;
modify an appearance of at least said portion of said selected video stream by altering a value of at least one determined property responsive to user input and the at least one determined property,
apply the altered value to the selected video stream to effect color corrections of the selected video stream; and
apply color corrections to another of the at least two video streams in accordance with the selected video stream after color correction.

16. The system of claim 15, comprising at least one sensing device for determining at least one property.

17. The system of claim 15, comprising a user interface for enabling user inputs.

18. The system of claim 17, wherein said user interface comprises at least one of a wireless remote control, a pointing device, such as a mouse or a trackball, a voice recognition system, a touch screen, on screen menus, buttons, and knobs.

19. The system of claim 17, wherein said at least one property is communicated to said color correction device using said user interface.

20. The system of claim 15, comprising at least two image capture devices for capturing said at least two video streams.

21. The system of claim 15, comprising a stereo camera for capturing said at least two video streams.

22. The system of claim 15, wherein said color correction device constructs three-dimensional models of objects using differences between the at least two video streams.

23. The system of claim 15, wherein a combination of light source properties and geometrical properties are refined using an illumination image and a specular image encoded with light and geometry information for a three dimensional environment.

24. A non-transitory computer-readable medium containing program instructions that, when executed by a processor, perform a method comprising:
capturing at least two separate video streams corresponding to a pair of stereoscopic images of a scene;
determining at least one property of at least a portion of a selected video stream; and
modifying an appearance of at least said portion of said selected video stream by altering a value of at least one determined property responsive to user input and the at least one determined property, and applying the altered value to the selected video stream to effect color corrections of the selected video stream; and
applying color corrections to another of the at least two video streams in accordance with the selected video stream after color corrections.

25. The non-transitory computer-readable medium of claim 24, wherein said at least one property comprises at least one of light properties, surface color, reflectance properties, and scene geometry of said at least one portion of said selected video stream.

* * * * *